J. J. GARD & E. G. RUTHRAUFF.
MOTOR OPERATED CROSSING GATE.
APPLICATION FILED SEPT. 23, 1908.
1,049,843.
Patented Jan. 7, 1913.
4 SHEETS—SHEET 1.
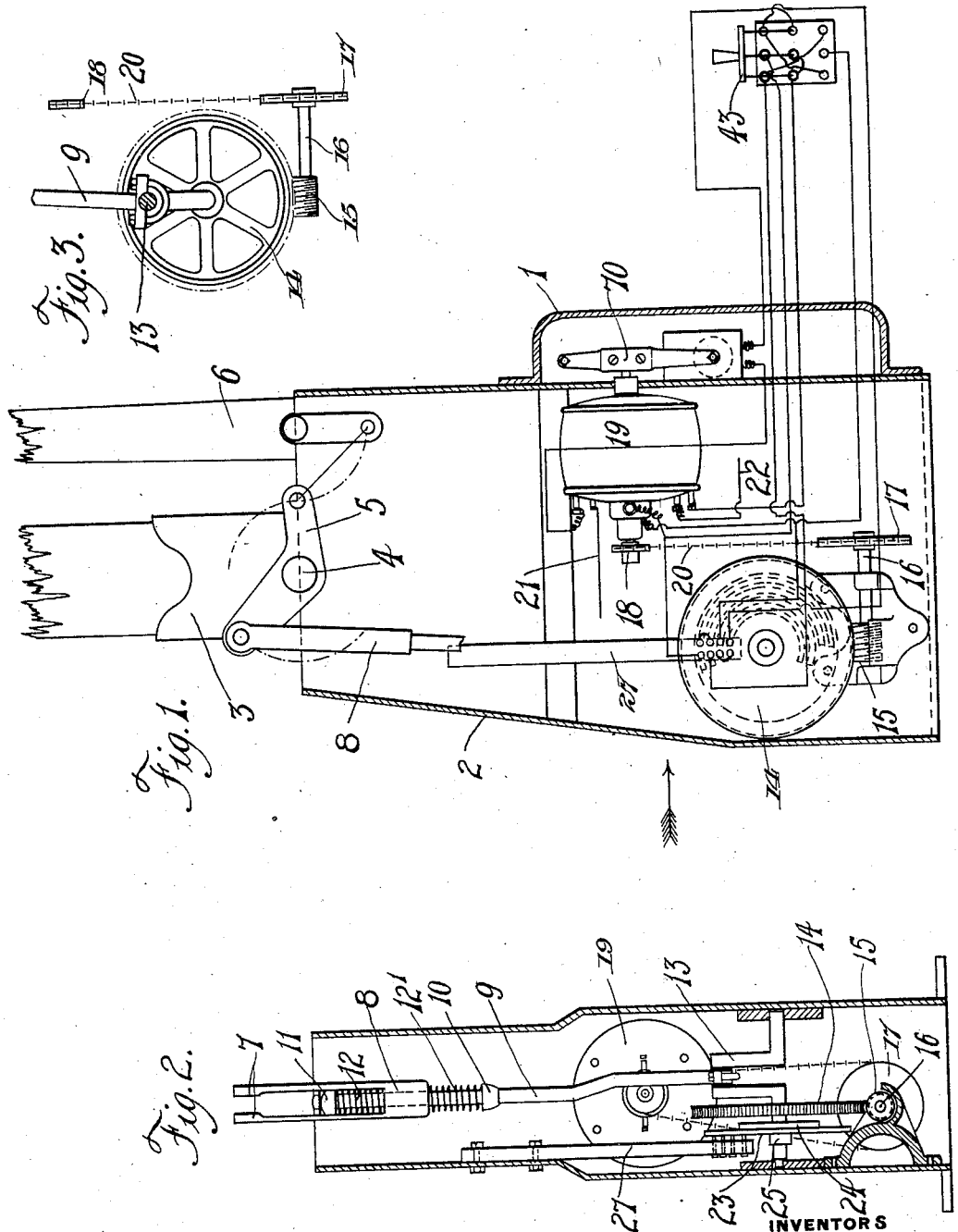

J. J. GARD & E. G. RUTHRAUFF.
MOTOR OPERATED CROSSING GATE.
APPLICATION FILED SEPT. 23, 1908.

1,049,843.

Patented Jan. 7, 1913.

WITNESSES
A. Y. Andrews.
D. C. Williams.

INVENTORS
John J. Gard
Edwin G. Ruthrauff
by attys
Symmestvedt & Carpenter

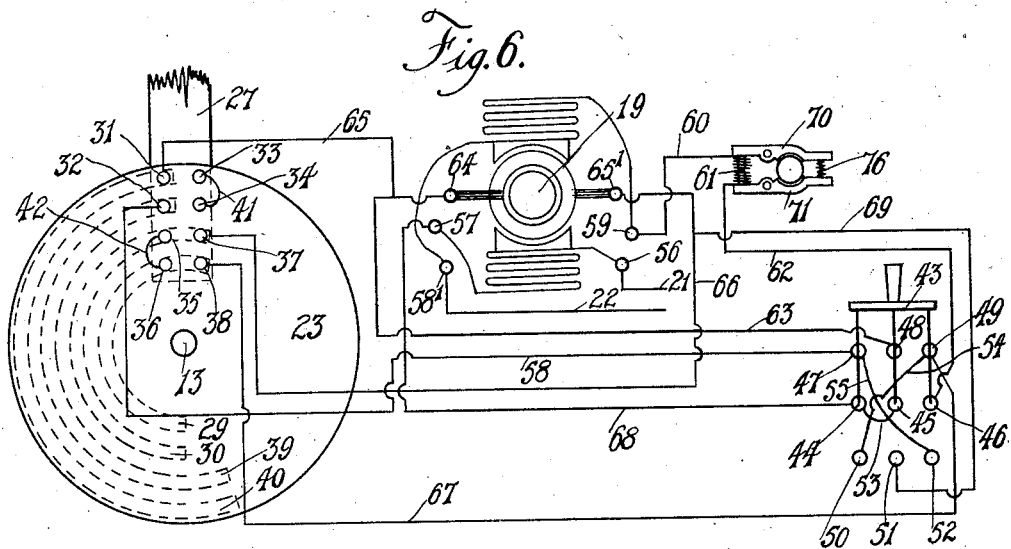
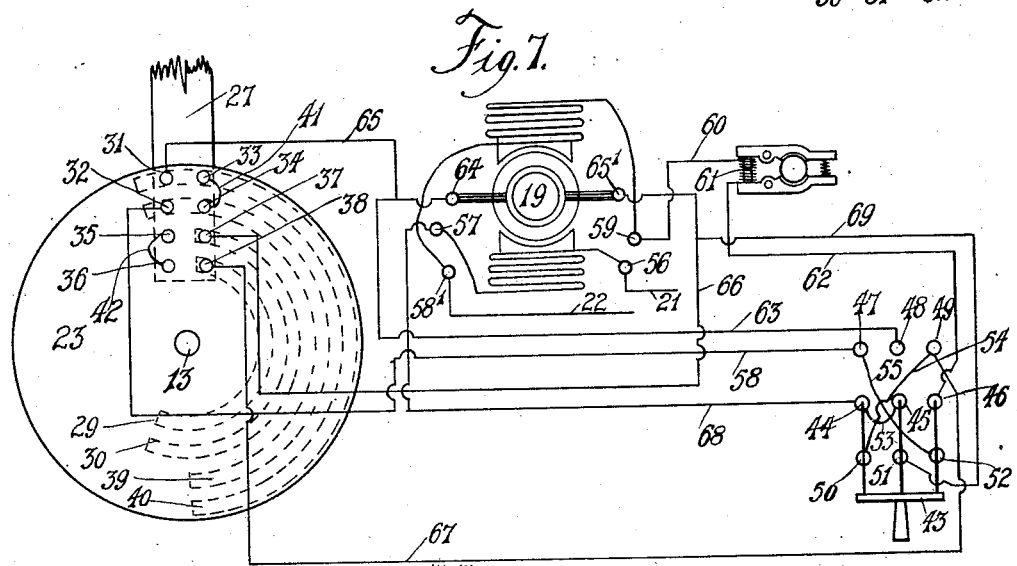
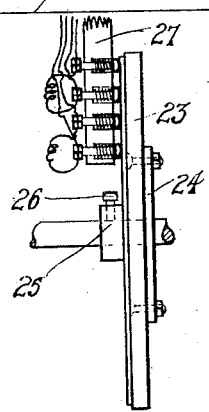

J. J. GARD & E. G. RUTHRAUFF.
MOTOR OPERATED CROSSING GATE.
APPLICATION FILED SEPT. 23, 1908.
1,049,843.
Patented Jan. 7, 1913.
4 SHEETS—SHEET 4.
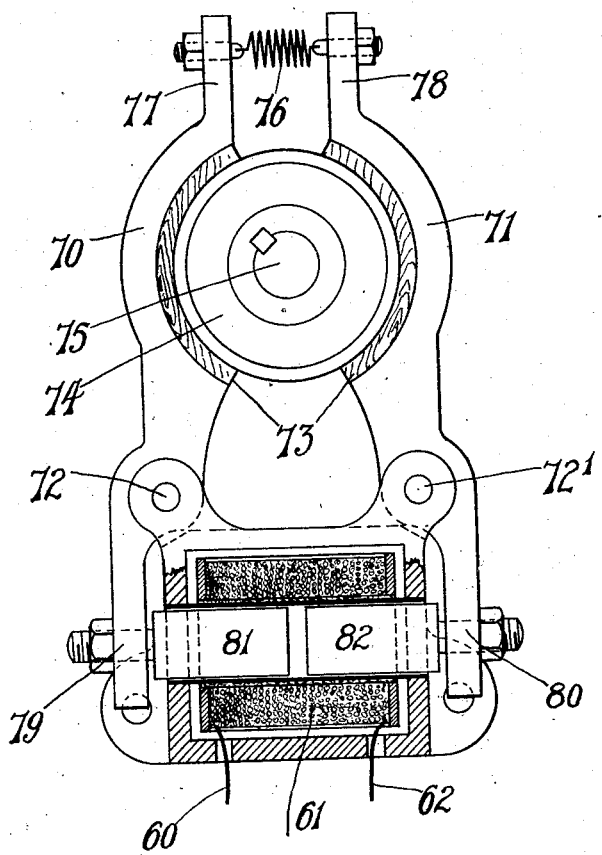
WITNESSES
INVENTORS

UNITED STATES PATENT OFFICE.

JOHN J. GARD AND EDWIN G. RUTHRAUFF, OF HARVEY, ILLINOIS, ASSIGNORS TO BUDA FOUNDRY & MANUFACTURING COMPANY, OF CHICAGO, ILLINOIS, A CORPORATION OF ILLINOIS.

MOTOR-OPERATED CROSSING-GATE.

1,049,843.  Specification of Letters Patent.  Patented Jan. 7, 1913.

Application filed September 23, 1908. Serial No. 454,417.

*To all whom it may concern:*

Be it known that we, JOHN J. GARD and EDWIN G. RUTHRAUFF, citizens of the United States, residing at Harvey, in the county of Cook and State of Illinois, have invented certain new and useful Improvements in Motor-Operated Crossing-Gates, of which the following is a specification.

Our invention relates particularly to crossing gates and means for operating them and also means for holding them in position when the operative power has been shut off and the gates are at rest, though other uses for our invention will be evident from the specification.

Our invention has for its objects the provision of an improved form of operating mechanism and improved connections and arrangement of parts whereby the operating mechanism may be driven from an electric motor; to provide a construction of greater simplicity and strength which will be more inexpensive to build, more certain and precise in operation, readily reversible and economical in operation and maintenance, and which will require a minimum of care and attention.

Our invention further contemplates the provision of means whereby the gate may be stopped at any point in its movement and which when stopped will be firmly held at the point of stoppage until power is again applied to put the gate in motion, to provide means whereby the motion of the gate may be reversed in direction at any point of its movement, and to provide an arrangement of parts both electrical and mechanical whereby the locking mechanism is caused to act by throwing off the current from the motor. These and other objects of our invention which will hereinafter appear are attained by means of a construction, one embodiment of which is illustrated in the accompanying drawings wherein—

Figure 1 is a longitudinal section through the operating mechanism, the gate being shown in raised position and the electric wiring diagrammatically;

Figure 2 is a side elevation of the construction shown in Figure 1 taken in the direction indicated by the arrow, part of the casing having been removed;

Figure 3 is an enlarged detail elevation of certain driving elements which have been removed from Figure 1 for the sake of clarity;

Figure 6 is a similar view when the gate is down and starting to go up;

Figure 7 is a similar view when the gate is up and starting to go down;

Figure 8 is an elevation to illustrate more fully the manner in which certain electrical contacts are carried, and—

Figure 9 is an enlarged detail of the braking mechanism forming part of, and preferably used in connection with, the present invention.

Figure 4:
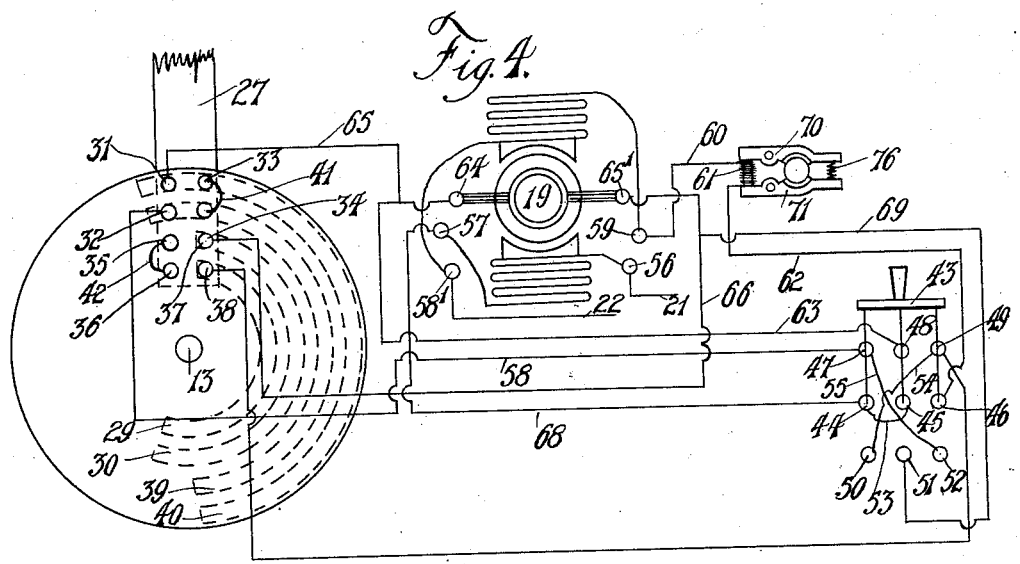
Figure 4 is a diagrammatic representation of the electrical elements in the position and relation the parts assume when the gate is in its fully raised position.
Figure 5:
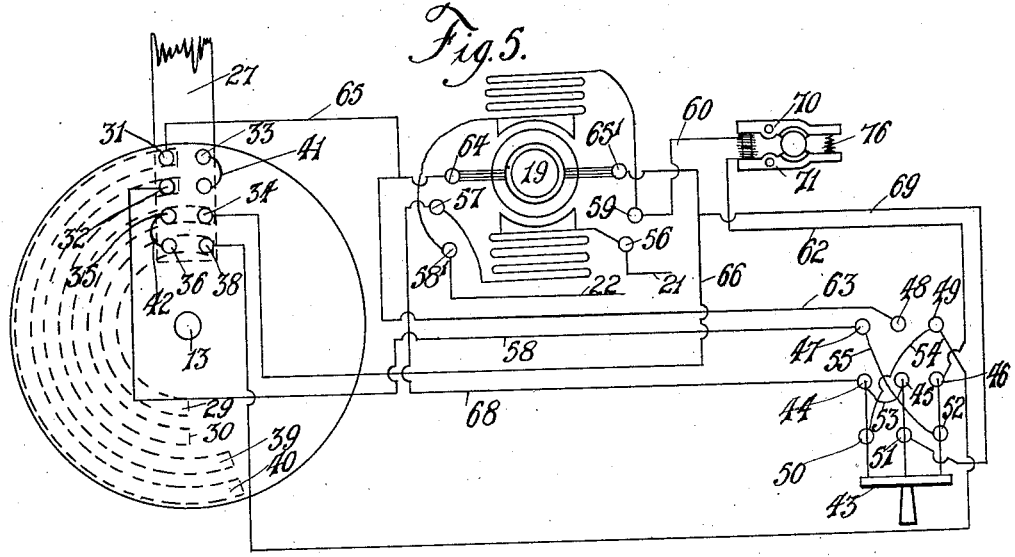
Figure 5 is a similar view when the gate is in its fully lowered position.

Referring now to the drawings, particularly Figures 1 and 2, it will be seen that we provide the casing members 1 and 2 for our improved form of device, the gate itself 3 being mounted on a shaft 4 which carries a bell crank lever 5 to one end of which is coupled the short gate 6. To the other end of the lever 5 are attached the ends 7 of a clevis 8. The said clevis at its other end engages with the connecting rod 9 provided with stop collar, 10 and 11, in order that springs 12 and 12' may be inserted and held in position on the lever, 9, to absorb any shock that may accompany the starting of the gate in either direction. The other end of the lever, 9, is connected to crank shaft 13 which carries a worm wheel, 14, driven by the worm, 15, on the shaft, 16. For the purpose of driving the worm we provide a sprocket, 17, driven from the pinion, 18, on the shaft of a motor, 19, by means of a chain, 20. The motor, 20, may be driven from any convenient source of power.

Further referring to Figures 2 and 8 it will be noted that on shaft, 13, we have mounted a disk, 23, preferably of hard fiber or other non-conductive material, for the purpose of carrying the contact strips hereinafter to be more particularly described, which disk is held in position on the shaft by means of the plate, 24, to which it is connected and the collar, 25, which is provided with a set screw, 26. For making contacts therewith we have arranged a contact carrier, 27, one end of which is bolted to the casing, 2, and the other end, adjacent the rings on the disk, 23, is provided with a plurality of contact members to be hereinafter more fully described.

Referring now more particularly to Figures 4, 5, 6, 7, and 8 it will be apparent that the stationary contact carrier, 27, carries two series of contacts, the first of which are numbered 31, 32, 33 and 34 and the second 35, 36, 37 and 38, and that the contact carrying disk, 23, carries a series of contact rings, 29 and 30, and 39 and 40, respectively. The contact members are adapted to contact with the rings as follows: members, 31 and 33 with the ring 40, members 32 and 34 with the ring 39, members 35 and 37 with the ring 30, and members 36 and 38 with the ring 29. It will be further seen that the contact members, 33 and 34, and likewise the contact members, 35 and 36, are connected together electrically, by the wires 41 and 42 respectively.

Referring now more particularly to Figures 4, 5, 6 and 7 it will appear that we have provided a series wound reversible motor, 19, for the purpose of driving the operating mechanism. For the purpose of illustration of our invention we have shown the feed wires 21 and 22 which may be connected to any convenient source of electrical current or a transformer or dynamo, (not shown). The said motor, 19, is controlled by means of a three-pole double-throw switch, 43, having binding posts, 44, 45 and 46 and knife contact members, 47, 48 and 49 for making the circuit which is used in lifting the gate and like contact members, 50, 51 and 52 for making the circuit which is used in lowering the gate. It will be noted that the members, 44 and 45, 49 and 50, and 47 and 52, are respectively connected permanently by the wires 53, 54 and 55 respectively. The main, 21, is connected to the binding post, 56, of one motor field and from a corresponding binding post, 57, of such field a wire, 68, leads to switch blade 44. The main, 22, is connected to a binding post, 58' of the opposite field and from corresponding binding post, 59, of such field the wire, 60, leads to the coil, 61, of the brake device illustrated in Figure 9 to be hereinafter more fully described. From the opposite end of the said coil, 61, a wire, 62, leads to the switch blade, 46. From the contact, 48, a wire, 63, leads to armature binding post 64, and the said post 64 is also connected to the contact 31 by the wire 65. The other armature binding post 65' is connected by the wire, 66, to the contact 37, and the post, 65', is likewise connected by the wire, 69, to the contact, 51. The contact, 38, is connected by the wire, 67, to the contact 49, and the contact 47 is connected by the wire, 58, to the contact 32.

Referring now more particularly to Figures 1 and 9, it will be noted that for the purpose of braking the motor, 19, when the current is thrown off we have provided the braking device illustrated in detail in Figure 9.

This device consists in the opposing jaw members, 70 and 71, suitably mounted between the casing members, 1 and 2, and pivoted at, 72 and 72' respectively. These braking members are provided with suitable brake shoes, 73, preferably of wood, designed to act upon a pulley wheel, 74, keyed to the motor shaft, 75. The braking members, 70 and 71, are normally drawn together by the spring, 76, attached to their respective ends, 77 and 78. At their opposite ends, 79 and 80, are attached soft iron cores, 81 and 82, respectively, adapted to be drawn together when the electro magnet coil, 61 is excited.

From inspection of Figures 1, 4, 5, 6 and 7, it will be apparent that in Figure 4 the electrical elements are in the position to which they will be moved when the gates have been fully lifted and that inasmuch as the contacts, 35 and 36, have moved out of contact with the plates, 29 and 30, the electrical circuit through the coil, 61, has been opened, since the said coil, 61, is in series with the motor field and the electro magnet has therefore lost its power, and the spring, 76, has drawn the braking members, 70 and 71 together, pressing the brake shoes against the pulley wheel on the motor shaft and thus stopping the motor. When it is desired to lower the gate, the switch, 43, is moved into the position shown in Figure 7, which will start the motor and release the brake and when the gate is fully lowered the parts will assume the position shown in Figure 5 and inasmuch as the contacts 33 and 34 will then no longer contact with the rings, 39 and 40, the electrical circuit will be opened and the motor will stop through the operation of the brake as above described. When it is desired to raise the gate, the switch, 43, is moved into the position shown in Figure 6, which will start the motor and release the brake and when the gate is fully raised the parts reassume the position shown in Figure 4 and the electrical circuit will be opened and the brake applied as above described.

If it be desired to stop the gate in the ascending movement, the switch, 43, may be opened, breaking the electrical circuit including the parts numbered 21, 56, 57, 68, 44, 53, 45, 48, 63, 64, 65', 66, 37, 30, 35, 42, 36, 29, 38, 67, 49, 46, 62, 61, 60, 59, 58', 22, or if the gate is descending the switch, 43, may be opened, breaking the electrical circuit including the parts numbered 21, 56, 57, 68, 44, 53, 45, 51, 69, 65', 64, 65, 31, 40, 33, 41, 34, 39, 32, 58, 47, 55, 52, 46, 62, 61, 60, 59, 58', 22. In either event the brake will be applied and the motor stopped as above indicated, and the gate may be thereafter lifted or lowered as desired, since the contacts, 33 and 34 are in contact with the rings, 39 and 40 respectively, and the contacts, 37 and 38, in contact with the rings, 29 and 30, respectively, at all times save when the gate is fully lifted or lowered. It will thus be evident that in a construction embodying our invention the motor will be automatically stopped when the gate has reached the extreme limit of its movement, and may be manually stopped at any part of its movement by opening the switch.

Having thus described our invention and illustrated its use what we claim as new and desire to secure by Letters Patent is the following:—

1. In a railway crossing gate, the combination of a casing, a shaft mounted therein, a gate mounted on the shaft, a crank arm for the shaft, a link secured to the crank arm, a main crank shaft mounted in the casing, a motor for turning the crank shaft, a connecting arm secured to the crank shaft and telescoping in the link, a pair of abutments mounted on the connecting arm on opposite sides of the link, a pair of oppositely disposed springs mounted on the connecting arm, each adapted to abut the link and one of the abutments whereby the movement of the gate in either direction is yieldingly arrested, and means for actuating the motor.

2. In a railway crossing gate, the combination of a casing, a shaft mounted therein, a gate mounted on the shaft, a crank arm for the shaft, a link secured to the crank arm, a main crank shaft mounted in the casing, a motor for turning the crank shaft, a connecting arm secured to the crank shaft and telescoping in the link, an abutment on the connecting arm on one side of the link, a removable and adjustable abutment on the connecting arm on the other side of the link, a pair of oppositely disposed springs mounted on the connecting arm each adapted to abut the link and one of the abutments whereby the movement of the gate in either direction is yieldingly arrested, and means for actuating the motor.

In testimony whereof we have hereunto signed our names in the presence of the two subscribed witnesses.

JOHN J. GARD.
EDWIN G. RUTHRAUFF.

Witnesses:
PAUL CARPENTER,
ALFRED Y. ANDREWS.

Copies of this patent may be obtained for five cents each, by addressing the "Commissioner of Patents. Washington, D. C."